United States Patent [19]

Golata et al.

[11] 4,317,597
[45] Mar. 2, 1982

[54] WHEEL DISC AND METHOD FOR MANUFACTURE THEREOF

[75] Inventors: John H. Golata, Lansing; John R. Kinstler, Mason, both of Mich.

[73] Assignee: Motor Wheel Corporation, Lansing, Mich.

[21] Appl. No.: 148,792

[22] Filed: May 12, 1980

Related U.S. Application Data

[62] Division of Ser. No. 906,485, May 17, 1978, Pat. No. 4,241,597.

[51] Int. Cl.³ .............................................. B60B 1/06
[52] U.S. Cl. ................................................. 301/63 R
[58] Field of Search .............. 29/159.01; 72/327, 82; 295/21, 27; 113/116 D; 301/63 R, 63 PW, 64 SD, 65, 6 CS; 172/535

[56] References Cited

U.S. PATENT DOCUMENTS

| | | | |
|---|---|---|---|
| 3,051,271 | 8/1962 | Spannagel et al. | 301/6 CS |
| 3,129,496 | 4/1964 | Cox | 29/159.01 |
| 3,262,191 | 7/1966 | Albertson et al. | 29/159.01 |
| 3,391,439 | 7/1968 | Bulgrin et al. | 29/159.01 |
| 3,442,110 | 5/1969 | Walton et al. | 29/159.01 |
| 3,767,267 | 10/1973 | Clement | 301/6 CS |
| 3,964,144 | 6/1976 | Kopp | 29/159.1 |

*Primary Examiner*—H. Grant Skaggs
*Attorney, Agent, or Firm*—Barnes, Kisselle, Raisch & Choate

[57] ABSTRACT

An improved tapered wheel disc and method of making the same which includes the steps of spin-forming a radially outwardly-tapering concave disc from a section of blanked stock and piercing hand holes in the spun-tapered disc, the improvement comprising the step of placing the disc surface area around each hand hole in compression by embossing the disc from a direction internally of disc concavity to form a region surrounding each hand hole which is offset outwardly of disc concavity.

5 Claims, 10 Drawing Figures

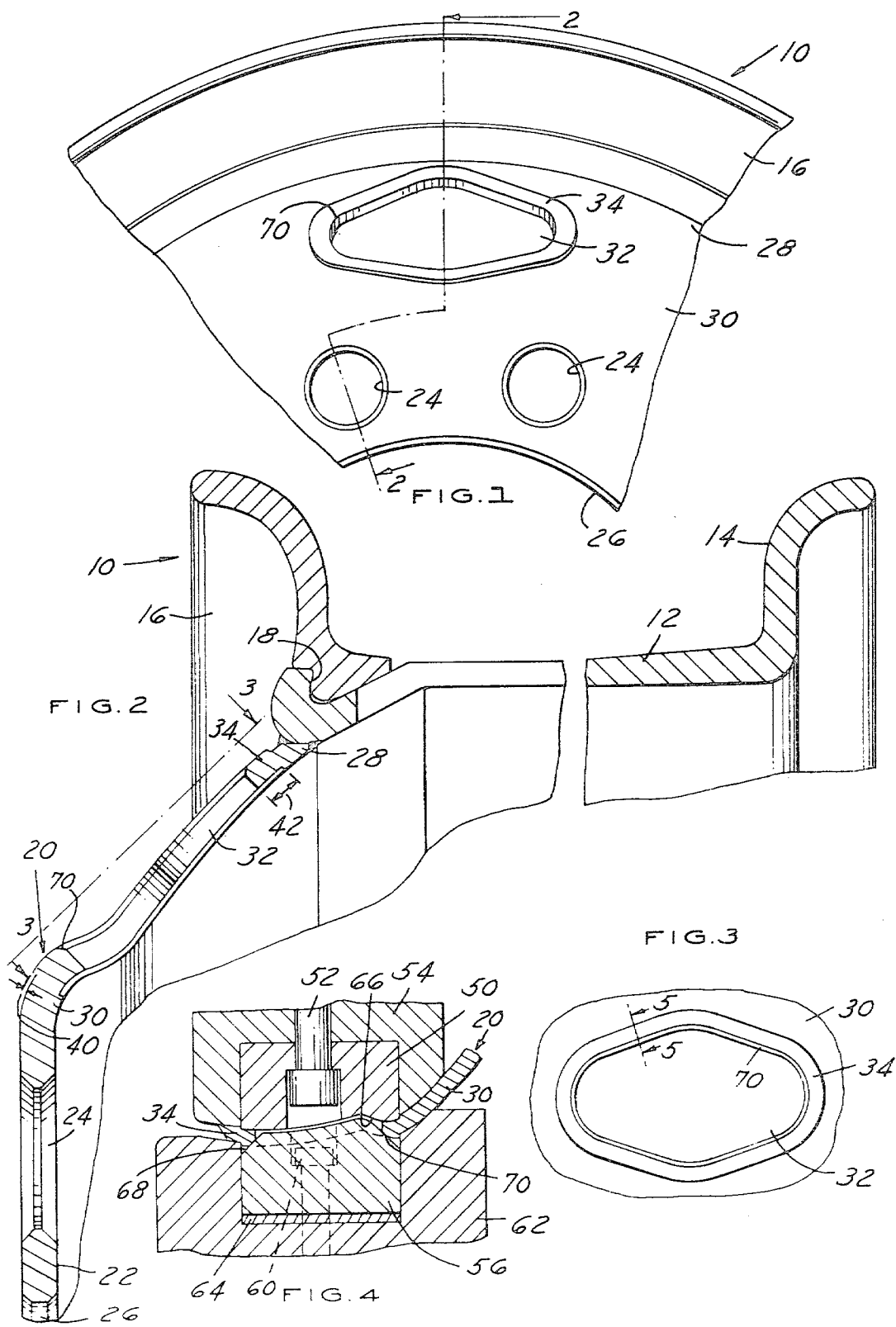

WHEEL DISC AND METHOD FOR MANUFACTURE THEREOF

This is a division of application Ser. No. 906,485, filed May 17, 1978 now U.S. Pat. No. 4,241,597.

The present invention relates to spun-tapered wheel discs and to methods for manufacture thereof.

An object of the present invention is to provide an improved method for manufacture of spun-tapered wheel discs which places the disc in a desired state of residual stress, and thereby enhances disc operating characteristics and fatigue life.

More specifically, it is an object of the present invention to provide a method for tailoring the residual disc surface stresses in the region surrounding the disc hand holes.

A further object of the invention is to provide a spun-tapered wheel disc having enhanced durability and operational characteristics.

The invention, together with additional objects, features and advantages thereof, will be best understood from the following description, the appended claims and the accompanying drawings in which:

FIG. 1 is a fragmentary elevational view of a wheel which includes a spun-tapered disc provided in accordance with the present invention;

FIGS. 2 and 3 are a sectional view and a fragmentary plan view respectively taken along the lines 2—2 in FIG. 1 and 3—3 in FIG. 2;

FIG. 4 is a sectional elevational view of punch and die tooling which schematically illustrates embossing of the disc hand holes in accordance with the present invention;

Figure 5:
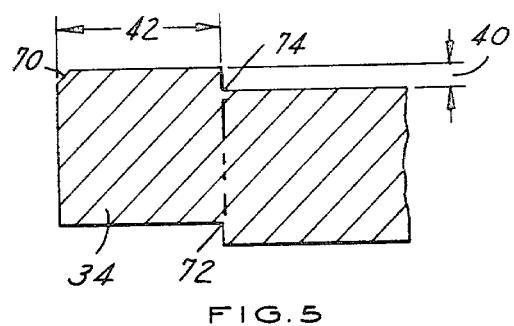
FIG. 5 is an enlarged sectional view taken along the line 5—5 in FIG. 3.

Referring to the drawings, FIGS. 1–3 illustrate a heavy-duty truck wheel 10 which comprises a generally cylindrical rim base 12 having an integral tire-bead-retaining flange 14 at one axial end thereof. A demountable bead-retaining flange ring 16 is captured in a circumferentially continuous channel 18 in rim base 12 at an axial end thereof remote from integral flange 14. A wheel disc generally indicated at 20 includes a central portion 22 provided with the usual bolt holes 24 and hub locating hole 26, and an outer peripheral edge 28 welded to rim base 12 radially inwardly of channel 18. The wheel rim may alternatively include integral flange rings and a drop center for tire mounting without departing from the scope of the present invention. A radially outwardly tapering (narrowing in thickness in an outward direction radially of the wheel axis) intermediate disc portion 30 connects central portion 22 with edge 28 and includes hand holes 32 to facilitate mounting of a wheel on an axle hub or the like.

Methods for spin forming disc 20 are generally old in the art, as exemplified by the U.S. patents of Luther et al U.S. Pat. No. 3,143,015 and Bulgerin et al U.S. Pat. No. 3,143,377, and conventionally include the steps of spin-forming a concave wheel disc from a section of blanked stock and then piercing hand holes 32 and bolt holes 24 in the spun disc. As a tool ring forms the disc over a spinning mandrel, the thickness of the disc is gradually tapered. The forming operation leaves residual compression stresses on the disc inner and outer surfaces which, together with inherent spring characteristics to the tapering disc contour, have been found to yield desirable reliability and performance characteristics.

Wheel 10 is intended to be mounted on an axle hub such that the concave side thereof faces inboard and surrounds the associated wheel brake. For this reason, it has been preferred to pierce hand holes 32 from a direction internally of disc concavity to produce a clean burnished hole edge at the inside surface and thereby reduce the likelihood of cutting of the hands while the wheel is being grasped for mounting. The piercing operation breaks or tears away metal at the hole edge adjacent the external disc surface as the punch completes its stroke which leaves residual and undesirable tension stresses on the external surface. It has been common practice to relieve or reverse such localized tension stresses by further operations which place the external disc surface adjacent the hand holes once again in compression, such as by means of a bevel coining operation or the like, or by shot-peening the entire disc. However, it has been found to be difficult to control the quality of the bevel coining operation, while the shot peening operation is unduly expensive and yields erratic results.

In accordance with the present invention, localized residual tension stresses surrounding the hand hole on the external or convex disc surface resulting from the forming and/or piercing operation are reversed, and the surface area is placed in compression, by embossing the disc from a direction internally of disc concavity to form a marginal region 34 surrounding each hand hole 32. Margin 34 is thus offset outwardly of disc concavity such that the outboard and inboard surfaces thereof are offset outwardly from the corresponding surfaces of intermediate disc portion 30 which surround and are contiguous with margin 34. Embossing from a direction internally of disc concavity has been found to impart to margin 34 residual surface stresses which are once again in compression and at substantially the same level as prior to the hand hole piercing operation, thereby insuring that inboard and outboard surfaces of the finished disc throughout its spun tapered intermediate portion 30, including the hand hole areas, embody residual compression stresses. Outward embossment is thus preferred both for this reason and because the outwardly-directed embossment margin 34 increases the clearance between the disc and brake drum (not shown) when wheel 10 is mounted on a vehicle. Although piercing of the hand holes from internally of disc concavity is not critical, it is preferred for reasons previously set forth.

It has been found that the quality and consistency of the embossing operation as well as the level and definition of residual compression stress may be closely controlled by merely measuring the height or offset distance 40 (FIG. 2) of margin 34 from the outer face of contiguous disc intermediate portion 30. The preferred offset height or distance 40 (FIGS. 2 and 5) is in the range of 0.005 to 0.080 inches. It has also been found that the width 42 (FIG. 2) of embossed margin 34 should not exceed 0.5 inches from the edge of hand hole 32.

FIG. 4 schematically illustrates suitable tooling for performing the above-discussed embossing operation comprising a punch insert 50 mounted by a screw 52 to a moveable upper shoe 54, and a die insert 56 mounted by a screw 60 in the cavity of a lower fixed shoe 62 with a piece of shim stock 64 being disposed between insert 56 and the cavity root. The striking face 66 of punch 50 generally follows the desired contour of disc intermediate portion 30, while the die insert 56 includes a bevelled portion 68 around the outer periphery thereof to bevel slightly the outside edge 70 of offset margin 34 and thereby eliminate breakout burrs which may lacerate a user's hand. As noted above, it is presently preferred to direct disc concavity inwardly when the line disc and the associated wheel are mounted to a vehicle to provide clearance for a brake drum. However, the terms "internal" and "external" are used with reference to disc concavity in the appended claims and not with reference to the mounted orientation of the disc and wheel on a vehicle.

Figure 6:
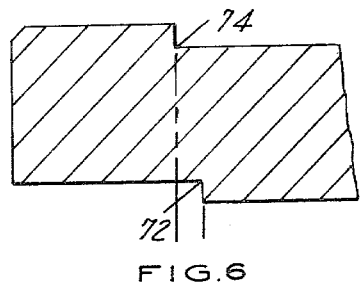
FIGS. 6–10 are enlarged sectional views similar to that of FIG. 5 and illustrating alternative embodiments of the invention.
Figure 7:
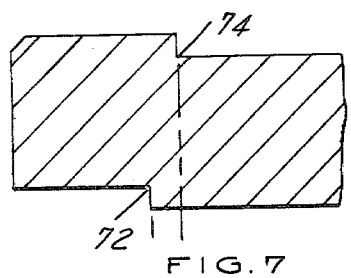
Figure 8:
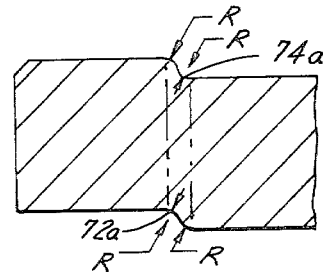
Figure 9:
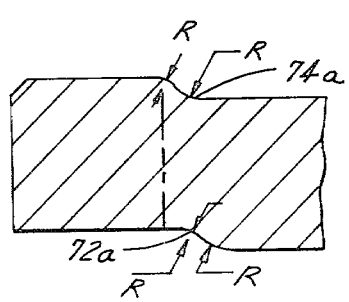
Figure 10:
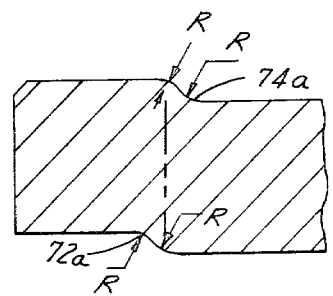

FIGS. 5-10 illustrate various alternative embossment configurations, in accordance with the invention. FIG. 5 is an enlarged view of a section of FIG. 3 and illustrates a standard or regular embossment margin wherein the inner and outer embossment corners 72,74 are sharp and are aligned axially of the disc. FIG. 6 illustrates an offset embossment, i.e. one wherein inner corner 72 is disposed radially outwardly of corner 74, and FIG. 7 illustrates an inset embossment, i.e. one wherein corner 72 is radially inwardly of corner 74. FIG. 8 illustrates a regular embossment having radiused corners in axial alignment. In FIG. 9 the radiused inner corner 72a is radially outwardly offset from outer corner 74a, while in FIG. 10 the radiused inner corner 72a is inset with respect to edge 74a. The radiused and offset configuration of FIG. 9 is preferred because the radiused corners eliminate unnecessary stress concentration, while the offset corners help prevent shearing during the forming operation (FIG. 4).

The invention claimed is:

1. In a concave spun tapered wheel disc adapted for use in a truck wheel which comprises a central portion containing hub and bolt holes, a peripheral edge adapted to be secured to a truck wheel rim, a radially tapering intermediate portion connecting said central portion to said peripheral edge and means forming hand holes in said intermediate portion, said disc having an inboard concave surface and an outboard convex surface, the improvement wherein said intermediate portion of said disc includes an embossed marginal region entirely surrounding each hand hole and having inboard and outboard surfaces uniformly and substantially identically offset in a direction away from disc concavity with respect to contiguous inboard and outboard surface portions of said disc intermediate portion surrounding each said marginal region, and wherein the concave inboard and convex outboard surfaces of said intermediate portion of said disc, including said inboard and outboard surfaces of each said marginal region, contain residual compressive stresses.

2. The wheel set forth in claim 1 wherein the corner of said marginal region internally of disc concavity adjacent to said contiguous inboard surface portion of said disc has a dimension diametrically across the hand hole which is greater than the corresponding dimension of the corner of said marginal region externally of disc concavity adjacent to said contiguous outboard surface portion of said disc.

3. The wheel set forth in claim 2 wherein said internal and external corners are radiused.

4. The wheel set forth in claims 1, 2 or 3 wherein said disc tapers radially across said hand hole, and wherein said region is offset by a substantially uniform amount in the range of 0.005 to 0.080 inches.

5. The wheel set forth in claim 4 wherein the width of said offset region radially of said hand hole is substantially uniform and is less than or equal to 0.5 inches.

* * * * *